July 2, 1940.  L. F. OLT  2,206,262
PACK OF GASKETS
Filed Aug. 11, 1938
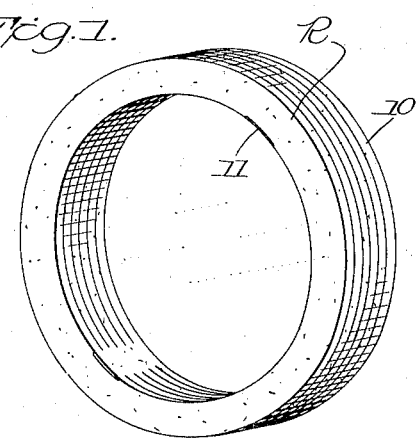
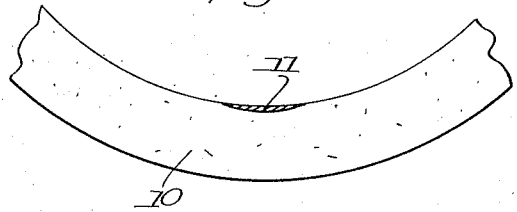
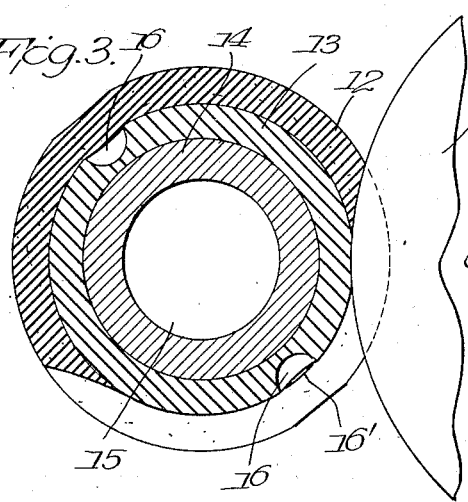
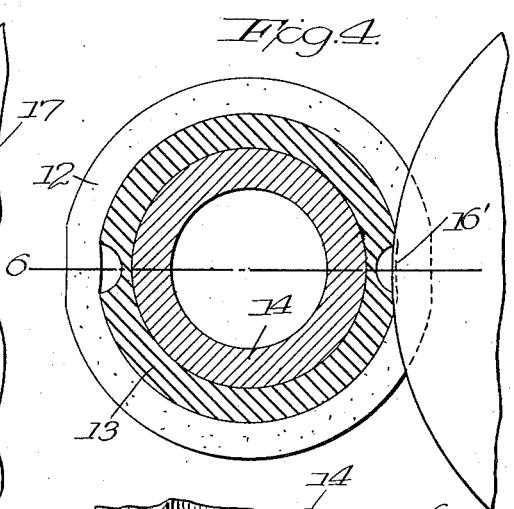
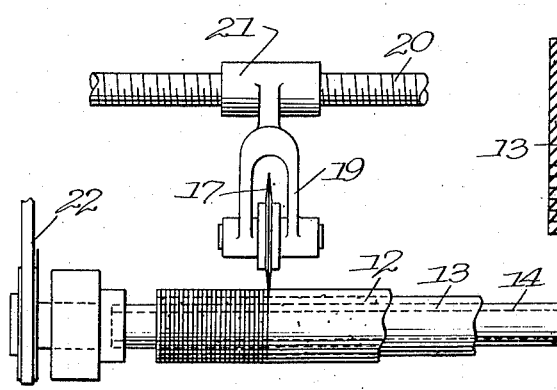
Inventor
Leonard F. Olt
By Cushman Darby & Cushman
Attorneys Patented July 2, 1940

2,206,262

UNITED STATES PATENT OFFICE 2,206,262

PACK OF GASKETS

Leonard F. Olt, Baltimore, Md., assignor to Crown Cork & Seal Company, Inc., Baltimore, Md., a corporation of New York Application August 11, 1938, Serial No. 224,369

1 Claim. (Cl. 206—56)

The present invention relates to gaskets and more particularly a pack of gaskets. The term "gaskets" is intended to include ring-like bodies or discs formed from a wide variety of materials, such as rubber and plastic products and of round or angular configuration, including special gasket shapes, washers and jar rings.

In the manufacture of rubber jar rings, for example, it is customary to form the same from a rubber tube and completely sever rings of proper thickness from the tube throughout the length thereof. These individually formed rings are then removed from the mandrel of the ring forming machine and collected for packaging. The counting of such separate, loose rings into required multiples such as half dozens, dozens, etc., and the aligning of the rings for boxing, involves considerable time and labor as will be appreciated, creating a substantial expense which influences the manufacturing costs adversely, notwithstanding that automatic counting and packaging machinery are used.

It is the object of the present invention to eliminate entirely the counting step, and to so simplify the packaging, that these operations are conducted at a considerably reduced manufacturing expense.

In carrying out the present invention, as distinguished from completely severing each of the rings from the tube, the cutting member or knife is operated to make an incomplete severance of one less than the total of a plurality or required number of rings and a complete severance only is made after each successive desired multiple of rings has been incompletely severed from the tube. Thus, to make packs of one-half dozen connected rings, the cutting knife will operate to incompletely sever five rings, and will completely sever the sixth so that, as removed from the ring forming mandrel, the six rings are united, and there is no need for manual or machine counting. Furthermore, the confusion attendant upon having a multiplicity of separate, loose rings collected on the work bench is avoided. This procedure can be carried out to automatically and continuously provide any desired multiples, the knife being set to make a complete severance at the proper positions along the tube according to the number of rings required for each multiple or pack.

The resultant pack of rings are held together by a thin film or web of rubber which constitutes an integral part of all of the gaskets and is a substantially circumferential portion of the original tubular body. This film or web is disposed at the inner circumference of the ring and, in effect, forms a narrow continuous band connecting all of the rings of the pack together. The band is of a thinness and comprehends a minor portion of the inner circumference of the rings, i. e., less than substantially 25°, whereby the rings may be readily pulled apart or severed by the usual domestic scissors or a kitchen knife.

It will be appreciated that by having the rings arranged in a connected pack, not only is the time consuming counting operation avoided, but the necessity of aligning the rings for packaging is eliminated, and it is only necessary for the operator to dispose each compact unit in a suitable box. Also, this method of forming the rings in connected multiples very materially facilitates machine packaging.

If it is not desired to automatically form the rings in units or packs, as just described, the tube may be cut to form a multiplicity of incompletely severed rings throughout its length, and thereafter an operator or a machine, if desired, may count the rings and tear off, or sever packs each of the required numbers of rings for packaging. This latter method is not preferred, but, in some cases, may be found useful.

A very important advantage of the present invention resides in having rings of each pack of uniform color and composition. That is to say, where the rings are individually severed, loose rings collected from various tubular bodies become mixed and may be packed together. In such packages, any variations in color and composition become so noticeable as to require that the package be rejected as the same may be unsalable. However, with the present invention, the rings being cut from the same tube and being permanently held together as units, no such objectional result will occur, and the packs or units form a very attractive and salable article.

Before explaining in detail the present invention, it is to be understood that the invention is not limited in its application to the details of construction or the arrangements of parts illustrated in the accompanying drawing, since the invention is capable of other embodiments and of being practiced or carried out in various ways. Also, it is to be understood that the phraseology or terminology is for the purpose of description and not of limitation, and it is not intended to limit the invention claimed herein beyond the requirements of the prior art.

Referring to the drawing:

Figure 1 is a perspective view of a jar ring pack consisting of six rings connected together by diametrically opposed peripheral bands and made in accordance with this invention.

Figure 2 is a detail view broken away to show the thinness and extent of the connecting band and its position at the inner periphery of the ring.

Figure 3 is a cross-section of the mandrel with the rubber tube disposed thereon and being severed by a rotary ring forming knife.

Figure 4 is a cross-sectional view similar to Figure 3 and showing the manner in which a unit is completely severed from the tubular rubber body.

Figure 5 is a plan view illustrating the apparatus for continuously forming the rings and units thereof, and Figure 6 is a sectional view on the line 6—6 of Figure 4.

While for convenience, I have illustrated the invention in connection with conventional "Mason" jar rings which are usually made of rubber, it is to be understood that gaskets of other materials and various sizes and shapes are produced in accordance with the invention.

Referring to Figure 1, the pack consisting of a multiple of six rings R is indicated as a whole at 10, and these rings are completely severed and separate from each other throughout their peripheries, except for the opposed continuous bands 11 on the inner peripheries of the rings whereby they are held in connected aligned relation. These bands are thin, being of film-like structure, as shown in Figure 2, and provide a connecting web which is an integral part of all of the gaskets and a substantially continuous circumferential portion of the original tubular body from which the rings are formed. The connecting web 11 assures that the rings will be held together in aligned relation as a unit so that the necessity for counting is eliminated and a very convenient pack is produced for boxing. Moreover, the connecting band is so thin, flimsy or weak that the housewife may readily tear the individual rings apart as they are required for use or sever them with an ordinary domestic scissor or knife. As will be appreciated, by having the rings in a connected pack, there is no danger of them falling upon the floor and becoming dirty or misplaced as sometimes occurs with loose rings.

In forming the ring packs of the present invention and referring to Figures 3 to 6, a tube of rubber 12 is positioned over a casing 13 of plastic or resilient material disposed on and connected to a metal mandrel 14. This latter is mounted upon a shaft 15 connected to a suitable means for imparting rapid rotation to the assembly. The casing 13 is formed with one or more longitudinal grooves 16 parallel to the axis of the assembly, and, as shown in Figure 3, these grooves are preferably in diametrically opposed relation. The purpose of the grooves is to afford an enlarged space into which the rubber of the tubular body may expand or flow as shown at 16', so that when the rotating knife 17 which is set to have a constant throw moves over the area comprehended by the entrance or top of the groove or grooves, it does not produce complete severance of the tube at such points because the rubber has entered the groove to a distance greater than the throw of the knife. In this manner, a tube may be formed consisting of a multiplicity of incompletely severed rings throughout its length, all of the rings being held together by one or more of the continuous connecting bands 11.

Referring to Figures 4 and 6 which illustrate a preferred method of procedure, the knife 17, after it has incompletely severed, for example, five gaskets in the manner just above described, is given a deeper throw for the sixth gasket and is thereby caused to move into the rubber tube and the casing 13 beyond the depth to which the rubber may have flowed into the grooves 16. That is to say, the knife 17 penetrates such a distance as to completely sever the sixth gasket, whereby packs 10 of six gaskets each may be successively and automatically formed. The projection of the knife 17 through the rubber tube 12 and into the casing 13 is illustrated in detail in Figure 6 at 18. When the packs have been stripped from the mandrel, it is only necessary for an operator or a machine to place the same in boxes, since they are already counted and aligned, and form a compact unit. This same procedure can be likewise adopted in the case where the rings are incompletely severed throughout the length of the tube and have been manually or by machine counted and severed into similar packs. It will be noted that the rings of each unit being successively formed from the same tube, are each of uniform appearance and composition, which is highly important, as above explained.

Referring to Figure 5, the knife 17 is loosely supported for rotation upon a yoke 19, which is caused to travel longitudinally of the tube by means of a rotating screw 20 engaging in a threaded boss 21 of the yoke. During the travel of the knife, the shaft 15 of the mandrel and the mandrel assembly, including the rubber tube 12, is rotated at a high rate of speed by reason of a pulley 22 connecting said shaft to a suitable prime mover, not shown. Rotation of the mandrel imparts frictional rotation of the knife 17 by reason of the contact of the latter with the tube 12, the throw of the knife being regulated to completely sever the rings from the tube 12 as shown in Figure 3, except at the groove or grooves 16, as heretofore explained. The yoke 19 is actuated by a cam mechanism to have a to and fro motion with respect to the tube 12 as it carries the knife longitudinally of the mandrel. This cutting and reciprocating motion of the knife is continuous and automatic, and in this manner, after each ring is cut, the knife is withdrawn and moved forward in position to successively cut the tube 12 into other rings of uniform thickness.

Where it is desired to completely sever the tube, as shown in Figures 4 and 6, to automatically and successively form connected units, the cam mechanism acts to give the yoke a deeper throw with respect to the ring 12 and casing 13, as above described, and the knife 17 carried by the yoke thus completely severs a ring from the tube, as shown at 18 to form packs each containing the desired number of rings.

I claim:

As a new article of manufacture, a multiplicity of flexible ring-like gaskets of the "Mason" jar type cut from a tubular body and held together solely by a continuous narrow flimsy film-like band extending axially of the tubular body, said band constituting an uncut integral part of the inner peripheries of all of the gaskets, said band being of substantially less width than the inner peripheries of the gaskets in their tubular connected relation and the connection between the gaskets being so weak that the gaskets can be manually separated without such mutilation of the freed gasket or the next adjacent gasket as would interfere with its sealing function.

LEONARD F. OLT.